March 23, 1954
R. E. BECKER
2,673,130
CYLINDER HEAD AND TUBE ASSEMBLY
Filed April 1, 1950
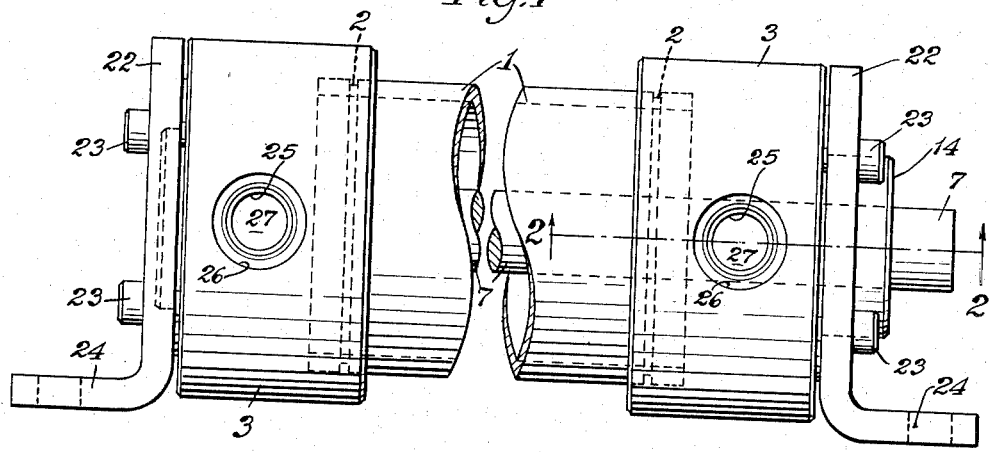
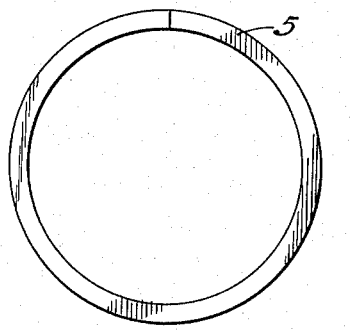
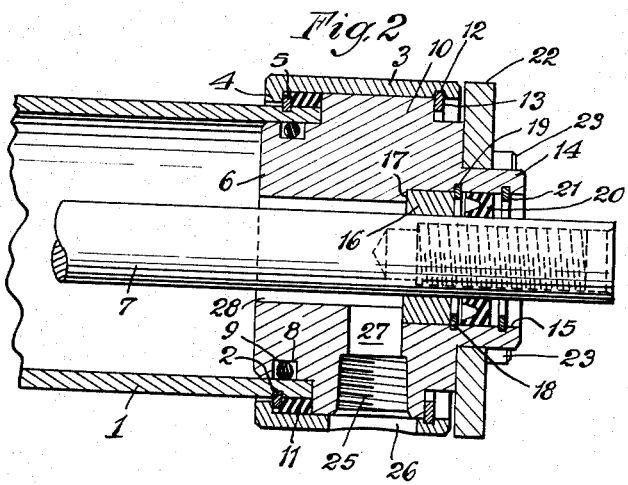
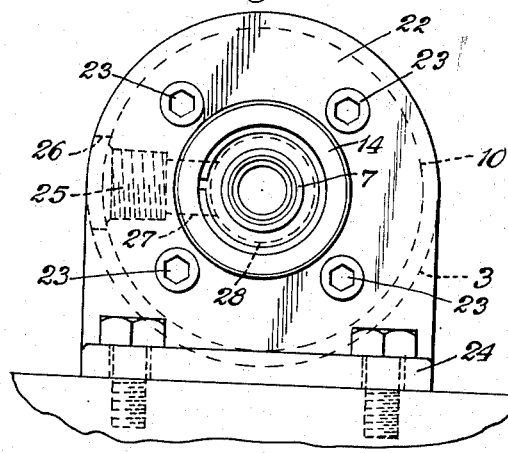
Inventor
Robert E. Becker
by Parker & Carter
Attorneys.

Patented Mar. 23, 1954

2,673,130

UNITED STATES PATENT OFFICE 2,673,130

CYLINDER HEAD AND TUBE ASSEMBLY

Robert E. Becker, Logansport, Ind., assignor to Logansport Machine Company, Inc., a corporation of Indiana Application April 1, 1950, Serial No. 153,327

12 Claims. (Cl. 309—2)

My invention relates to an improvement in cylinder head and tube assembly and has for one object to provide a cylinder for use with hydraulic machinery and the like, wherein the parts may be readily assembled and disassembled, will be light and strong, and wherein the inlet and outlet ports of the cylinder may be angularly positioned independent of one another about the axis of the cylinder.

Other objects will appear from time to time throughout the specification and claims.

My invention is illustrated more or less diagrammatically in the accompanying drawings, wherein—

Figure 1 shows a side elevation;

Figure 2 is a section along the line 2—2 of Figure 1;

Figure 3 is an end elevation;

Figure 4 is a side elevation of one of the holding rings.

Like parts are indicated by like characters throughout the specification and drawings.

1 is a thin-walled cylindrical tube open at both ends and preferably comprising merely an ordinary piece of steel tubing. Adjacent each end of the tube in the outer wall thereof is an annular groove 2. The annular groove 2 is of such depth as not to materially weaken the tube wall. 3 is a cylinder head sleeve. The sleeves at each end of the cylinder may be identical. Each sleeve is inwardly flanged as at 4. The inner diameter of the aperture defined by the flange being sufficiently less than the outer diameter of the tube to permit assembly of the sleeve on the tube. 5 is a snap ring of such size that it snugly fits the groove 2 and when in the groove has its two ends abutting the inner periphery of the snap ring 5 engaging the bottom of the groove 2, the opposed side walls of the ring 5 making a working fit with the walls of the groove 2. The ring extends outwardly to overlie the flange 4.

6 is a cylinder head. It may be centrally apertured as indicated in Figure 2 to permit passage of the piston rod 7 or at the other end of the cylinder it may be solid, if desired. The inner end of the head 6 has one diameter such that it penetrates and makes a suitable working fit with the interior of the sleeve 1. 8 is a groove in the outer peripheral wall of that portion of the head 6 that penetrates within the sleeve 1 and a rubber packing ring 9 may be contained within that groove between it and the sleeve 1. This packing ring is continuous and extends clear around the head.

Beyond the end of the sleeve 1 the head 6 is enlarged as at 10 to overlie the end of the tube 1 and make a close working fit with the inner wall of the sleeve 3. A compression ring 11 of rubber or other synthetic flexible and compressible material encircles the end of the tube 1 and fills the space between the ring 5 and the enlarged portion of the head 10.

The sleeve 3 adjacent its outer end has an interior annular groove 12 in which is a snap ring 13 similar to the ring 5, the snap ring 13 overlying the enlarged portion 10 of the head 6. Thus the two snap rings tie the tube, the sleeve and the head together. 14 is a boss extending outwardly from the outer end of the head 10, counter-sunk as at 15 to contain a ring 16 encircling the piston 7 and held in place against the shoulder 17 by the snap ring 18 in a groove 19 in the counter-sunk portion of the head. 20 is a packing ring encircling the piston rod 7 between the rod and counter-sunk portion of the head, and 21 is a similar snap ring engaging a groove in the inner periphery of the counter-sunk portion to limit the movement of the packing means.

22 is a spider, bolted or otherwise attached to the outer end of the head 10 by, for example, the set screws 23. The spider encircles the boss 14 and is provided with a leg 24 which may be attached to any suitable support. 25 is an interiorly threaded aperture in the head 10 in register with an aperture 26 in the peripheral wall of the sleeve 3. This aperture communicates through the passage 27 and passage 28 with the interior of the cylinder.

The use and operation of my invention are as follows:

The thin-walled tube is cut off to the desired length. The grooves 2 are cut by any suitable means in the outer periphery of the tube 1. The sleeve 3 is then slipped over the tube and moved downwardly away from the end so that the snap ring 5 may be snapped into place in the groove 2. Sleeve 3 is then moved out toward the end of the tube until the flange 4 engages the snap ring 5, the compression ring 11 having been previously placed about the tube 1 against the side wall of the snap ring 5. The packing ring 9 is then inserted in the annular groove 8 in the head 10 and the head is placed in the sleeve 3 to penetrate the end of the tube 1, the shoulder between the reduced portion 6 and the larger portion 10 of the head engaging the end of the tube and the compression ring 11. Then the snap ring 13 is snapped into the groove 12 to lock the head against longitudinal displacement with respect to the sleeve. It will be understood, of course, that the aperture 26 in the sleeve 3 and the threaded aperture 25 in the head are in register. The spider is then bolted in place on the end of the head. The head and the sleeve may be rotated to any desired position suiting the convenience of the designer and the position of the cylinder. This assembly takes place on both ends, the piston not shown and piston rod being assembled and inserted in the cylinder before one of the heads is put in place. The hydraulic pipes may then be screwed into the head aperture 25 to complete the hydraulic connection between both sides of the piston and the actuating mechanism.

This arrangement produces a compact, well-balanced hydraulic cylinder, no special casting of the cylinder itself being needed, and the shallow grooves in the outer periphery of the cylinder adjacent the ends do not materially or dangerously weaken the cylinder, especially since they are entirely enclosed within the sleeves. The cylinder may thus be assembled without expensive machinery and a fluid-tight assembly is obtained without the necessity of heavy tie bolts, cap screws or the like.

This open assembly permits the use of retainer or snap rings having full 360 degrees of bearing and thus greater shear load may be carried. The synthetic compression rings prevent end play of the covers or cylinder heads and the pipe tap inlet may be rotated in any position at an angle of 360 degrees.

I claim:

1. A cylinder assembly for hydraulic machines and the like including a thin walled cylinder having an open end, there being an annular groove in the outer periphery thereof adjacent the open end, an interiorly flanged sleeve encircling the cylinder, a snap ring within the groove overlying the sleeve flange, a cylinder head within the sleeve, packing means between the head and the cylinder, an annular groove in the inner periphery of the sleeve, a snap ring therein, overlying the head to prevent withdrawal thereof.

2. A cylinder assembly for hydraulic machines and the like including a thin walled cylinder having an open end, there being an annular groove in the outer periphery thereof adjacent the open end, an interiorly flanged sleeve encircling the cylinder, a snap ring within the groove overlying the sleeve flange, a cylinder head within the sleeve, packing means between the head and the cylinder, an annular groove in the inner periphery of the sleeve, a snap ring therein, overlying the head to prevent withdrawal thereof, the head having a portion penetrating the cylinder and a packing between the head and the cylinder.

3. A cylinder assembly for hydraulic machines and the like including a thin walled cylinder having an open end, there being an annular groove in the outer periphery thereof adjacent the open end, an interiorly flanged sleeve encircling the cylinder, a snap ring within the groove overlying the sleeve flange, a cylinder head within the sleeve, an annular groove in the inner periphery of the sleeve, a snap ring therein, overlying the head to prevent withdrawal thereof, the head having a portion penetrating the cylinder and the packing between the head and the cylinder, the packing including an annular groove in the outer periphery of the head and a circular continuous packing ring loosely contained within said groove between and engaging the head and the cylinder.

4. A cylinder assembly for hydraulic machines and the like including a thin walled cylinder having an open end, there being an annular groove in the outer periphery thereof adjacent the open end, an interiorly flanged sleeve encircling the cylinder, a snap ring within the groove overlying the sleeve flange, a cylinder head within the sleeve, packing means between the head and the cylinder, an annular groove in the inner periphery of the sleeve, a snap ring therein, overlying the head to prevent withdrawal thereof, the head overlying the end of the cylinder and having a portion penetrating the cylinder.

5. A cylinder assembly for hydraulic machines and the like including a thin walled cylinder having an open end, there being an annular groove in the outer periphery thereof adjacent the open end, an interiorly flanged sleeve encircling the cylinder, a snap ring within the groove overlying the sleeve flange, a cylinder head within the sleeve, packing means between the head and the cylinder, an annular groove in the inner periphery of the sleeve, a snap ring therein, overlying the head to prevent withdrawal thereof, the head overlying the end of the cylinder and having a portion penetrating the cylinder, a compression ring encircling the outer periphery of the cylinder between the snap rings therein and the head.

6. A cylinder assembly for hydraulic machines and the like including a thin walled cylinder having an open end, there being an annular groove in the outer periphery thereof adjacent the open end, an interiorly flanged sleeve encircling the cylinder, a snap ring within the groove overlying the sleeve flange, a cylinder head within the sleeve, a cylindrical portion adapted to contact the inner peripheral wall of the sleeve to overlie the end of the cylinder with a portion of reduced diameter adapted to penetrate the cylinder and engage the inner peripheral wall thereof, the penetrating portion of the head having an annular groove therein, a packing contained within such groove, a compression ring encircling the cylinder adapted to be compressed between the head, the cylinder, the sleeve and the snap ring on the cylinder.

7. A cylinder assembly for hydraulic machines and the like including a thin walled cylinder having an open end, there being an annular groove in the outer periphery thereof adjacent the open end, an interiorly flanged sleeve encircling the cylinder, a snap ring within the groove overlying the sleeve flange, a cylinder head within the sleeve, packing means between the head and the cylinder, an annular groove in the inner periphery of the sleeve, a snap ring therein, overlying the head to prevent withdrawal thereof, radial apertures in the sleeve and head, there being a passage in the head between the radial aperture therein and the interior of the cylinder.

8. A cylinder assembly for hydraulic machines and the like including an open ended cylinder having a thin wall of uniform thickness except for an annular groove in the outer periphery thereof adjacent the open end, an interiorly flanged peripherally continuous sleeve encircling the cylinder, holding means within the groove overlying the sleeve flange, a cylinder head within the sleeve, packing means between the head and the cylinder, an annular groove in the inner periphery of the sleeve, holding means therein, overlying the head to prevent withdrawal thereof.

9. A cylinder assembly for hydraulic machines and the like including an open ended cylinder having a thin wall of uniform thickness except for an annular groove in the outer periphery thereof adjacent the open end, an interiorly flanged peripherally continuous sleeve encircling the cylinder, holding means within the groove overlying the sleeve flange, a cylinder head within the sleeve, packing means between the head and the cylinder, an annular groove in the inner periphery of the sleeve, holding means therein, overlying the head to prevent withdrawal thereof, the holding means including elements substantially filling the grooves throughout the entire circumference thereof.

10. A cylinder assembly for hydraulic machines and the like including a thin walled cylinder having an open end, there being an annular groove in the outer periphery thereof adjacent the open end, an interiorly flanged sleeve encircling the cylinder, a snap ring within the groove overlying the sleeve flange, a cylinder head within the sleeve, an annular groove in the inner periphery of the sleeve, a snap ring therein, overlying the head to prevent withdrawal thereof.

11. A cylinder assembly including a thin walled cylinder open at one end, an annular groove in the outer periphery of the cylinder adjacent one end, a sleeve, the inner diameter of which is greater than the outer diameter of the cylinder, the sleeve being interiorly flanged to make a working fit with the cylinder, a snap ring filling the groove throughout substantially 360 degree angle and overlying the inner wall of the flange, a cylinder head having one outer diameter shaped to penetrate and make a working fit with the inner surface of the cylinder, another outer diameter adapted to penetrate and make a working fit with the inner surface of the sleeve and shouldered to abut the end of the cylinder, an annular groove in the inner wall of the sleeve, a snap ring therein, a shoulder on the head adapted to be engaged by the side of the snap ring in the sleeve, a compressible ring encircling the cylinder and adapted to be compressed between the snap ring on the cylinder and the shoulder on the inner end of the head.

12. In combination, an open ended cylinder, a sleeve encircling the cylinder, the inner diameter of which is greater than the outer diameter of the cylinder, the sleeve being interiorly flanged to make a working fit with the outer diameter of the cylinder, a cylinder head contained within the sleeve, making a working fit therewith, an annular groove in the outer periphery of the cylinder, adjacent the end thereof, an annular groove in the inner periphery of the sleeve adjacent the end furthest removed from the flange, snap rings contained within each of said grooves extending substantially 360 degrees thereabout, one ring being contained within the groove in the cylinder and engaging one wall of the flange in the sleeve, the other ring contained within the groove in the sleeve and engaging the head in a plane perpendicular to the axis of the cylinder.

ROBERT E. BECKER.

References Cited in the file of this patent

UNITED STATES PATENTS

| Number | Name | Date |
|---|---|---|
| 2,230,286 | Cotner | Feb. 4, 1941 |
| 2,299,695 | Greene | Oct. 20, 1942 |
| 2,389,824 | Smith | Nov. 27, 1945 |
| 2,426,108 | Loewe | Aug. 19, 1947 |
| 2,493,602 | Sterrett | Jan. 3, 1950 |
| 2,518,787 | Huhtala | Aug. 15, 1950 |